United States Patent
Yonetani (10) Patent No.: US 9,509,159 B2
(45) Date of Patent: Nov. 29, 2016

(54) SYSTEMS AND METHODS FOR DECREASING PEAK ENERGY CONSUMPTION OF A POWER CONSUMER USING VEHICLE BATTERY CAPACITY

(71) Applicant: Nissan North America, Inc., Franklin, TN (US)

(72) Inventor: Shinsuke Yonetani, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 281 days.

(21) Appl. No.: 14/220,646

(22) Filed: Mar. 20, 2014

(65) Prior Publication Data

US 2015/0268304 A1    Sep. 24, 2015

(51) Int. Cl.
*H02J 7/00* (2006.01)
*H02J 3/32* (2006.01)

(52) U.S. Cl.
CPC . *H02J 7/007* (2013.01); *H02J 3/32* (2013.01)

(58) Field of Classification Search
CPC .................................................. B60L 11/1842
USPC ........................................................ 320/134
See application file for complete search history.

(56) References Cited

U.S. PATENT DOCUMENTS

| | | | |
|---|---|---|---|
| 7,684,942 B2 | 3/2010 | Yun et al. | |
| 7,783,390 B2 | 8/2010 | Miller | |
| 8,103,386 B2 | 1/2012 | Ichikawa et al. | |
| 2008/0167756 A1 | 7/2008 | Golden et al. | |
| 2010/0211233 A1 | 8/2010 | Roscoe et al. | |
| 2010/0293046 A1 | 11/2010 | Cooke et al. | |
| 2011/0015799 A1* | 1/2011 | Pollack | B60L 11/1824 700/291 |
| 2011/0106336 A1 | 5/2011 | Eikeland et al. | |
| 2011/0125337 A1 | 5/2011 | Zavadsky et al. | |
| 2011/0204720 A1 | 8/2011 | Ruiz et al. | |
| 2011/0218693 A1* | 9/2011 | Tsunoda | G05D 9/12 700/297 |
| 2012/0029711 A1 | 2/2012 | Besore et al. | |
| 2013/0179061 A1 | 7/2013 | Gadh et al. | |

FOREIGN PATENT DOCUMENTS

WO    2013041656 A2    9/2012

* cited by examiner

*Primary Examiner* — Robert Grant
*Assistant Examiner* — Harry O'Neill-Becherril
(74) *Attorney, Agent, or Firm* — Young Basile Hanlon & MacFarlane, P.C.

(57) ABSTRACT

Systems and methods of reducing peak energy consumption of a power consumer comprise preprogramming an actual consumption line based on expected power usage, and determining the battery's connection time, required departure time, required departure energy and connection energy. A charge rate and a discharge rate are preselected, and a first charge energy level is calculated from the peak energy level less the discharge rate and the charge rate. A connection time of the battery when the battery is connected to the power consumer, a connection energy of the battery at the connection time, a required departure time of the battery, a required departure energy are determined. A power exchange curve is determined during a connection period between the connection time and the required departure time configured to minimize an expected peak energy level.

18 Claims, 7 Drawing Sheets

SYSTEMS AND METHODS FOR DECREASING PEAK ENERGY CONSUMPTION OF A POWER CONSUMER USING VEHICLE BATTERY CAPACITY

TECHNICAL FIELD

This disclosure relates in general to systems and methods for decreasing peak energy consumption of a power consumer, and in particular, relate to methods of peak shaving using the battery of an electric or hybrid vehicle.

BACKGROUND

For industrial and commercial power consumers, generally electricity prices are based on two elements: actual usage and a penalty based on the highest point of demand (or peak) within a billing period (weekly, monthly or annually). Demand is calculated using demand intervals, a short timeframe (often 15 minutes) during which overall usage is aggregated and tracked as a total. The average calculated is the kW demand for this period. Peak shaving is the ability to control the usage of power from a power supplier during intervals of high demand, in order to limit or reduce demand penalties for the billing period.

There are two possible approaches to peak shaving: reducing usage through load shedding and adding capacity with on-site generation. One example of adding capacity with on-site generation is through the use of a stationary battery that is charged during periods of low energy demand and discharged to the power consumer during periods of peak demand. Using a stationary battery in this way does not change a power consumer's actual usage but does decrease the highest point of demand and therefore the penalty owed by the power consumer.

SUMMARY

Disclosed herein are methods for decreasing peak energy consumption of a power consumer. One method disclosed herein comprises preprogramming an actual consumption line based on expected power usage, the actual consumption line having an actual peak consumption, a peak consumption start time and a peak consumption end time. The method further comprises preselecting a charge rate and a discharge rate, and calculating a first charge energy level from the peak energy level less the discharge rate and the charge rate. A connection time of the battery when the battery is connected to the power consumer, a connection energy of the battery at the connection time, a required departure time of the battery, a required departure energy are determined, and a power exchange curve is calculated during a connection period between the connection time and the required departure time configured to minimize an expected peak energy level.

A system for decreasing peak energy consumption of a power consumer as disclosed herein comprises a system controller preprogrammed with an actual consumption line based on expected power usage, the actual consumption line having an actual peak consumption, a peak consumption start time and a peak consumption end time. The controller is operable to preselect a charge rate and a discharge rate, determine a connection time of the battery when the battery is connected to the power consumer, a connection energy of the battery at the connection time, a required departure time of the battery, a required departure energy, calculate a first charge energy level from the peak energy level less the discharge rate and the charge rate, and calculate a power exchange curve during a connection period between the connection time and the required departure time configured to minimize an expected peak energy level.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

As electric vehicles increase in number, the need for charging stations to charge the electric vehicles also increases. As used herein, the terms "EV" and "electric vehicle" include pure electric and hybrid electric vehicles that use a charging station. A user of an electric vehicle will typically have an electric vehicle (EV) charger at his or her residence. However, EV chargers are also needed at an user's place of employment and other destinations to which an user drives his or her EV so that the EV has sufficient power to return to the residence.

Figure 1:
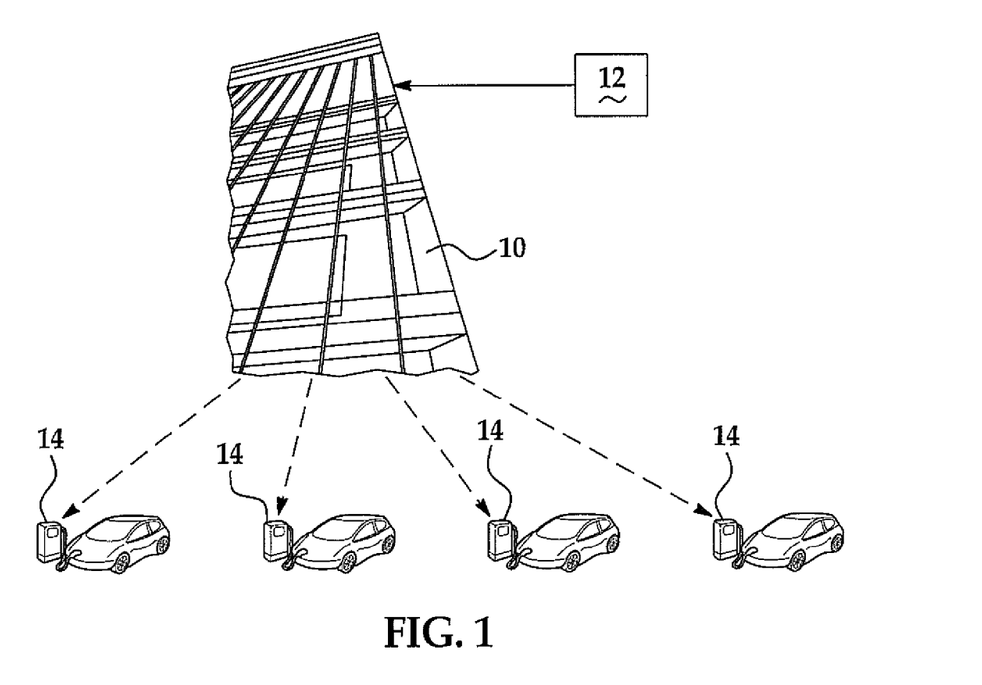
FIG. 1 is a schematic of a power consumer providing power from a power grid to EV charging stations.

To accommodate the EV users, whether the user is an employee or customer, commercial businesses will increasingly offer EV charging stations for use while the user is on site at the commercial business. Often times, these commercial businesses are large power consumers. As used herein, a "power consumer" is a commercial or industrial user of power from the power grid. Examples include but are not limited to office buildings, manufacturing facilities, large retail facilities, amusement parks, museums and other tourist facilities, and the like. The "power consumer" can also be a residence. As a large user of power, the power consumer is likely to experience periods of peak demand that increase the price it pays for power. FIG. 1 is a schematic of a power consumer 10 pulling power from the power grid 12. The power consumer 10 provides power to EV charging stations 14 utilized by employees of, customers of, of visitors to the power consumer 10, for example.

Figure 2:
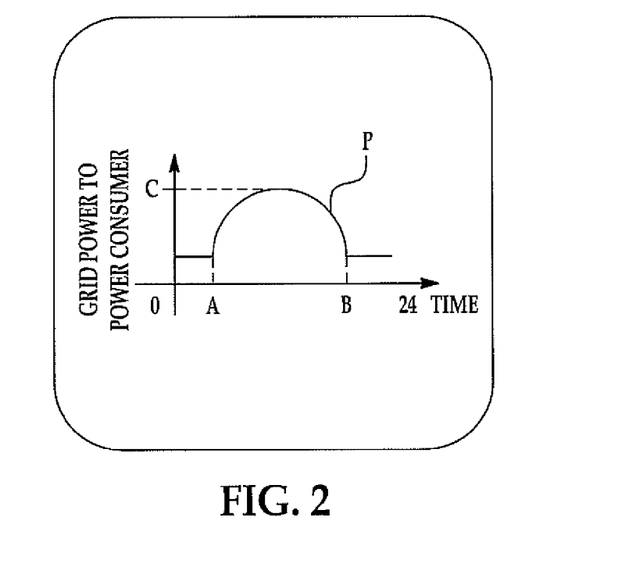
FIG. 2 is a graph illustrating power pulled from the power grid by a power consumer over a twenty-four hour period.

Offering EV charging stations will increase a power consumer's actual usage and likely increase the power consumer's peak consumption. The peak consumption period for power consumers typically occurs during the day between the hours of about 8 am and 6 pm, as these hours are typically when the most employees or customers are on-site, requiring heating or cooling from HVAC systems, lighting, computer power, and the like. FIG. 2 is an illustration of power pulled from the power grid by a power consumer over time. The graph in FIG. 2 represents an actual consumption line P. The peak energy consumption time period AB is determined from the power consumer's energy usage and can typically be obtained from the power provider. The power used by the power consumer in small increments of time is averaged and plotted against time, resulting in a curve similar to the one illustrated. The peak energy consumption graph is shown as an example, and actual peak energy consumption graphs can vary differently over the time period. Peak start time A can be, for example, 8 am, while peak end time B can be 6 pm. The graph illustrates the peak energy consumption C, occurring within the peak consumption time period AB. The use of EV charging stations by these employees or customers will also occur between these hours while the employee is working or the customer is inside the power consumer.

As one example, if the power consumer is a large office complex that provides EV charging stations for its tenants driving EVs, it is likely that the largest usage of the EV charging stations will be during the daytime working hours, such as 8 am and 6 pm. The users of the EVs using the charging stations, people who work at the large office complex, will remain at work for an extended period of time between the hours of 8 am and 6 pm. However, an EV battery can be charged in a much shorter period of time. For example, with the development of the quick charging method delivering direct current with a special connector, an EV battery can be charged in about thirty minutes. Therefore, there is significant time when an EV is available to but not using a charging station, and a comparatively insignificant time when the EV is using the charging station to charge its battery.

Figure 3:
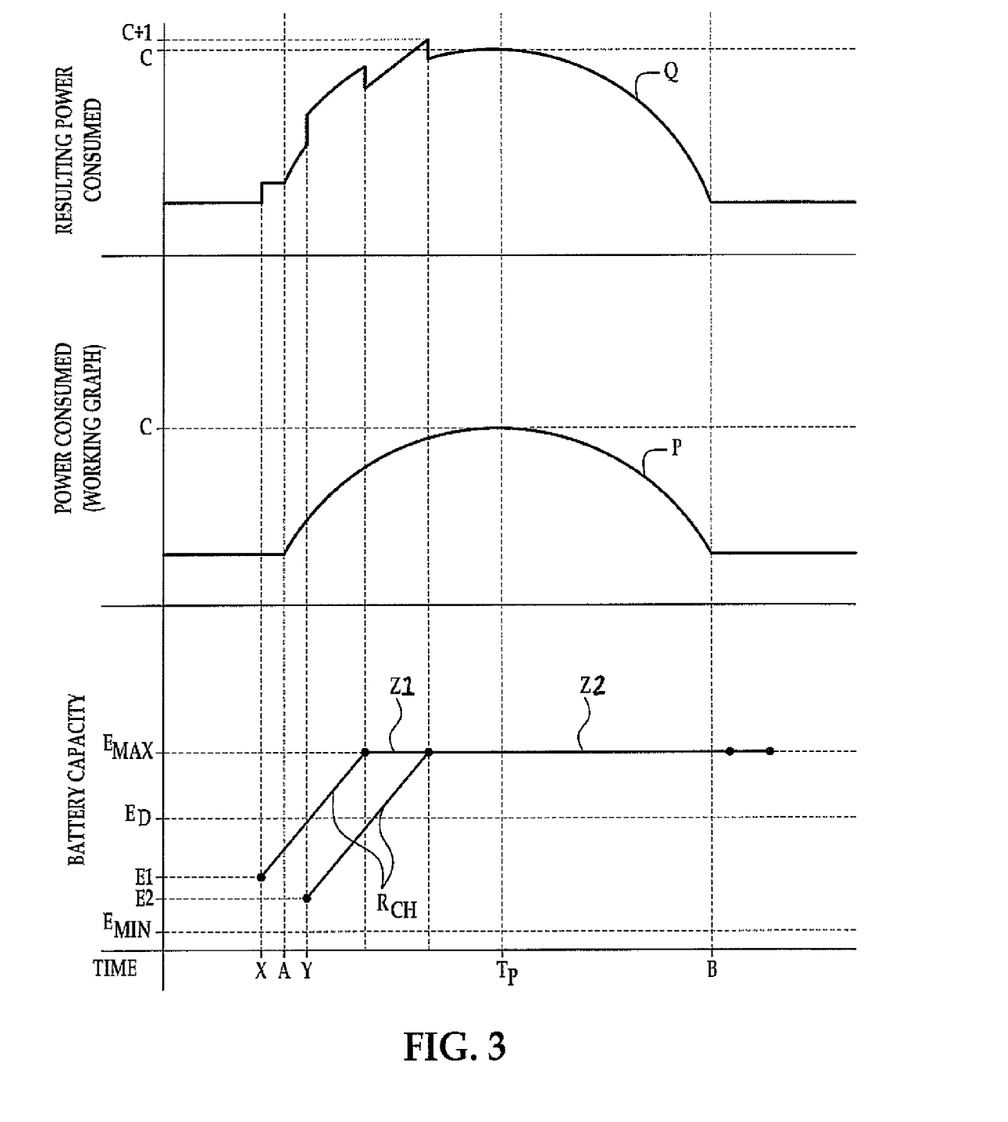
FIG. 3 is a graph illustrating the effect on power consumption and peak consumption when new EV charging stations are used.

FIG. 3 illustrates the conventional power usage when charging an EV with an EV charging station of a power consumer. EV 1 arrives and connects to the charging station at time X with a connection state of charge (capacity) E1, and is charged at the preselected charge rate $R_{CH}$ until the maximum capacity (or state of charge SOC) $E_{MAX}$ is reached as shown by battery capacity curve Z1. When EV 1 begins charging, the power usage of the power consumer increases as shown by the resulting power consumed curve Q. EV 2 arrives with a connection state of charge (capacity) E2 and begins charging at the preselected charge rate $R_{CH}$ at time Y as shown by the battery capacity curve Z2, at which point the power usage of the power consumer increases again. When EV 1 is fully charged, the power usage decreases, as EV 1 is no longer drawing a charge. When EV 2 is fully charged, the power usage decreases again, back to the power consumer's actual power consumption P, with no EVs charging. FIG. 3 illustrates how the introduction of EV charging stations may increase the actual peak consumption C of a power consumer, from C to C+1 as shown by the resulting power consumed curve Q, and thereby increase the fees owed by the power consumer. The examples are illustrative and one skilled in the art understands the effect of the illustrations is multiplied as the number of EVs utilizing a number of charging stations increases.

Power consumers are typically charged a penalty that increases as the peak of its energy consumption increases. The methods disclosed herein convert EV charging stations from consumers of power that increase peak energy consumption overall, and may contribute to an increase of the actual peak consumption C, to generators of power that reduce the actual peak consumption C. The methods take advantage of that time when an EV is available to, but not using, the charging station to ultimately reduce the peak energy consumption. With the methods herein, the EV can charge during charge periods up to a required departure amount of energy $E_D$ or a maximum energy amount $E_{MAX}$ and discharge to the power consumer through the EV charging station during discharging periods down to a minimum energy amount $E_{MIN}$ (or the required departure energy $E_D$) at variable rates during a connection time that spans at least part of the peak consumption period AB to reduce the actual peak consumption C, and sometimes the total energy consumption of the power consumer. The overall power consumption of the power consumer will increase as the charging station will pull power from the grid. However, decreasing (or maintaining at pre-EV level) the peak energy consumption will have a positive impact on the overall power spend of the power consumer.

The terms "peak shaving" and "reducing peak energy consumption" are used interchangeably herein. Also, when referring to charging and discharging the EV, it is understood to mean that the battery of the EV is charging and discharging. The methods are performed by a processor, which can be the existing processor of the charging stations preprogrammed with the methods herein or an existing processor on-board the EV.

The energy from the EVs available to reduce peak energy consumption C and the connection periods during which the EVs are connected to the charging station are unknown and will vary from day to day. Also, the EVs that use the EV charging stations must have sufficient energy capacity when the EV departs from the power consumer. The methods disclosed herein address these difficult issues.

Figure 5:
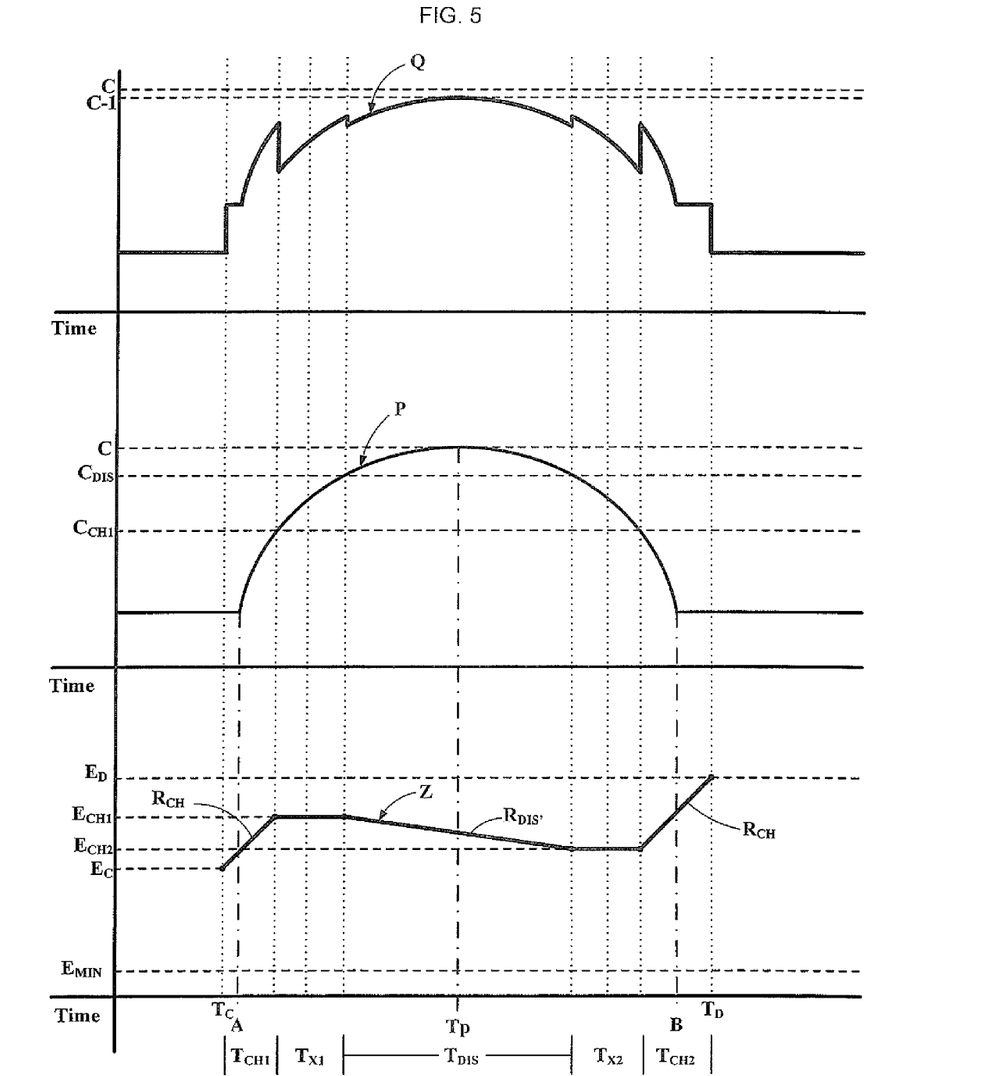
FIG. 5 is a graph illustrating a power exchange curve wherein a first charge energy is greater than a second charge energy according to the methods disclosed herein.

For the methods and systems herein for reducing peak energy consumption of a power consumer, an actual consumption line P is preprogrammed based on expected power usage, the actual consumption line P having a peak energy level C, a peak consumption start time A and a peak consumption end time B. These are illustrated in FIG. 5.

Figure 4:
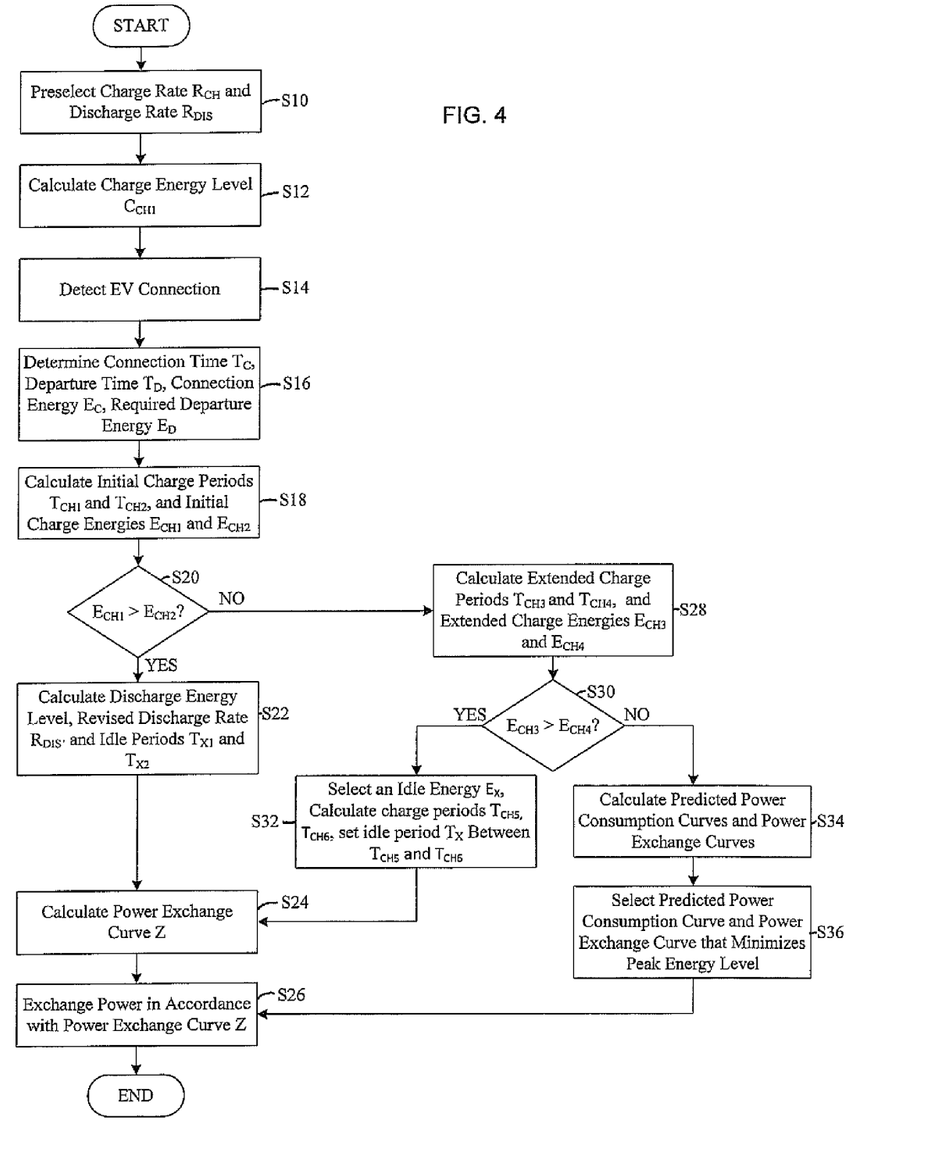
FIG. 4 is a flow diagram of a method for decreasing peak energy consumption of a power consumer as disclosed herein.

FIG. 4 is a flow diagram of a method of reducing the peak energy consumption of a power consumer. In step S10, a charge rate $R_{CH}$ and discharge rate $R_{DIS}$ are preselected. The charge and discharge rates can be the maximum charge and discharge rates for the battery and power exchange station, or can be other standard rates that are set as default rates, for example. In step S12, a first charge energy level $C_{CH1}$ is calculated from the peak energy level C less the discharge rate $R_{DIS}$ and the charge rate $R_{CH}$. The first charge energy level $C_{CH1}$ is shown in FIG. 5.

When an EV connects to a charging station, the system detects the connection in step S14. In step S16, a connection energy $E_C$ is detected. This connection energy $E_C$ can vary greatly depending on whether the user has the capability of charging where he or she was previously parked, the distance the user traveled to get to the power consumer, and the like. A required departure energy $E_D$ is also determined in step S16. The required departure energy $E_D$ can be set to an amount that represents "full" charge based on conventional charging stations. Alternatively, the required departure energy $E_D$ can be set by the user of the EV. For example, if the user of the EV has a charging station at home and lives nearby, the user may choose to set the required departure energy $E_D$ at a percentage lower than the "full" charge. The "full" charge can be a default required departure energy $E_D$, with the user able to change the default setting if desired.

To encourage the user to continue to use the charging stations, the EV must have the departure energy $E_D$ by the time $T_D$ the user is ready to depart the power consumer. The required departure time $T_D$ can be a default or programmed time that corresponds to the end of shift work, as a non-limiting example. The required departure time $T_D$ can be set to end at a normal work day, for example, 6 pm, so that those leaving at 6 pm or after will have the required departure energy $E_D$ at the required departure time $T_D$. The required departure time $T_D$ can also be input by the user of the EV.

The systems and methods disclosed herein calculate a power exchange curve Z during a connection period between the connection time $T_C$ and the required departure time $T_D$ configured to minimize an expected peak energy level. Ideally, the expected peak energy level will be lower than the peak energy level C. However, connection periods, connection energies $E_C$ and departure energies $E_D$ vary with every connection. When lowering the peak energy level C is not possible based on connection periods, connection energies $E_C$ and departure energies $E_D$, the systems and methods herein minimize the impact charging the EVs will have on the peak energy level.

In step S18, initial charge periods $T_{CH1}$, $T_{CH2}$ and initial charge energies $E_{CH1}$, $E_{CH2}$ are calculated. A first charge period $T_{CH1}$ is calculated from the connection time $T_C$ and a first time the first charge energy line $C_{CH1}$ crosses the actual consumption line P, as shown in FIG. 5. A second charge period $T_{CH2}$ is calculated from the required departure time $T_D$ and a second time the first charge energy line $C_{CH1}$ crosses the actual consumption line P. A first charge energy $E_{CH1}$ is calculated at an end of the first charge period $T_{CH1}$ using the preselected charge rate $R_{CH}$. A second charge energy $E_{CH2}$ is calculated at a start of the second charge period $T_{CH2}$ using the preselected charge rate $R_{CH}$.

In step S20, it is determined if the first charge energy $E_{CH1}$ is greater than the second charge energy $E_{CH2}$. If the first charge energy $E_{CH1}$ is greater than the second charge energy $E_{CH2}$, the method moves to step S22. If the first charge energy $E_{CH1}$ is less than or equal to the second charge energy $E_{CH2}$, the method moves to step S28.

When the first charge energy $E_{CH1}$ is greater than the second charge energy $E_{CH2}$, a discharge energy level $C_{DIS}$, a revised discharge rate $R_{DIS'}$ and idle periods $T_{X1}$, $T_{X2}$ are calculated in step S22. The discharge energy level $C_{DIS}$ is calculated from the peak energy level P less the preselected discharge rate $R_{DIS}$. The revised discharge rate $R_{DIS'}$ and a discharge period $T_{DIS}$ corresponding to the discharge energy level $C_{DIS}$ are then calculated. Calculating the revised discharge rate $R_{DIS'}$ comprises calculating the discharge period $T_{DIS}$ between a first time and a second time the discharge energy level $C_{DIS}$ crosses the actual consumption line P, as shown in FIG. 5. The revised discharge rate $R_{DIS'}$ is then calculated from the discharge period $T_{DIS}$ and a difference between the first charge energy $E_{CH1}$ and the second charge energy $E_{CH2}$. Idle periods $T_{X1}$, $T_{X2}$ occur between the first charge period $T_{CH1}$ and the discharge period $T_{DIS}$ and between the discharge period $T_{DIS}$ and the second charge period $T_{CH2}$, respectively.

In step S24, the power exchange curve Z is calculated as illustrated in FIG. 5. In step S26, power is exchanged between the EV battery and the power consumer or power grid according to the power exchange curve Z. As shown in FIG. 5, the battery is charged during the first charge period $T_{CH1}$ at the preselected charge rate $R_{CH}$, idled during the idle period $T_{X1}$, discharged during the discharge period $T_{DIS}$ at the revised discharge rate $R_{DIS'}$, idled during the idle period $T_{X2}$ and charged during the second charge period $T_{CH2}$ at the preselected charge rate $R_{CH}$.

Figure 6:
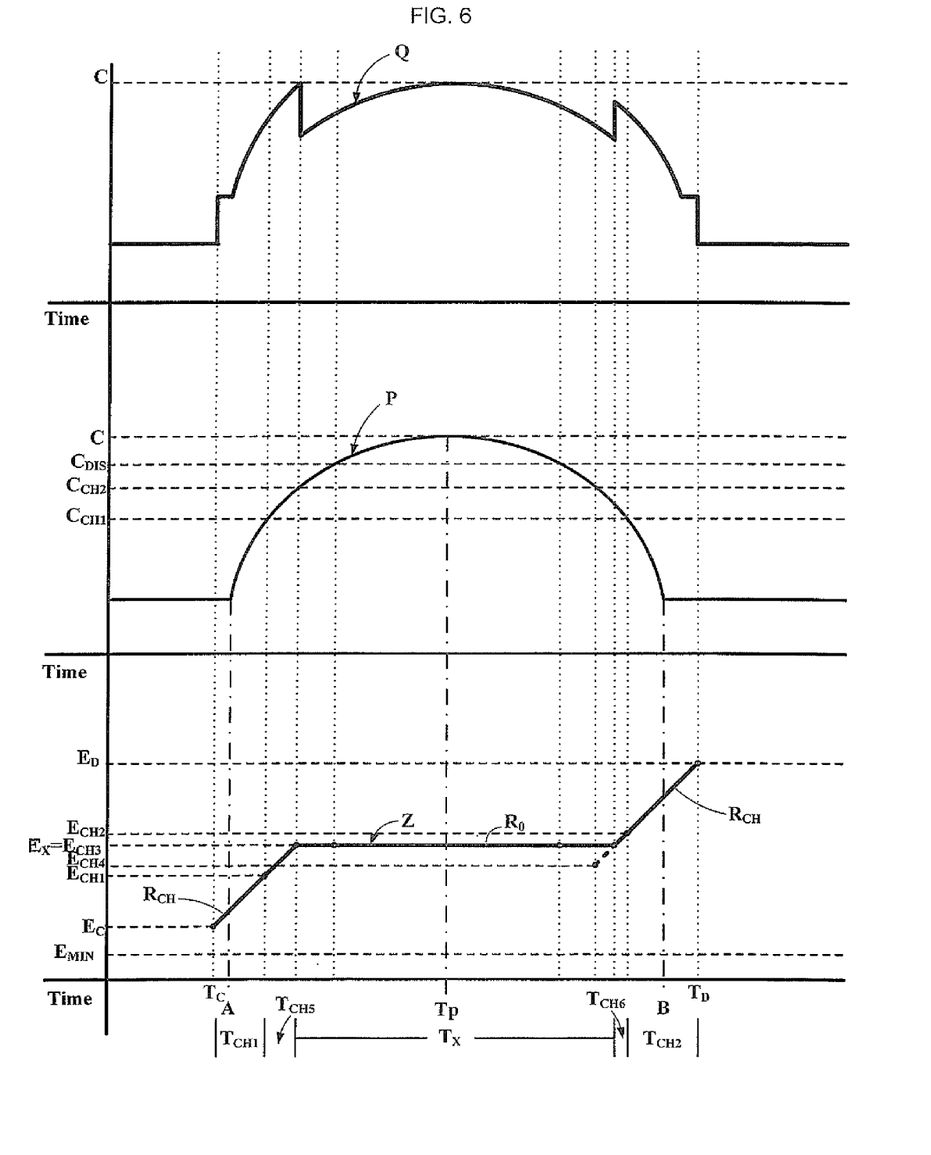
FIG. 6 is a graph illustrating a power exchange curve wherein a third charge energy is greater than a fourth charge energy according to the methods disclosed herein.

If, in step S20, the first charge energy $E_{CH1}$ is less than or equal to the second charge energy $E_{CH2}$, the method moves to step S28 to calculate extended charge periods $T_{CH3}$, $T_{CH4}$ and extended charge energies $E_{CH3}$, $E_{CH4}$. A second charge energy level $C_{CH2}$ is first calculated from the peak energy level C less the preselected charge rate $R_{CH}$. Extended charge periods $T_{CH3}$, $T_{CH4}$ are calculated based on the second charge energy level $C_{CH2}$. Referring to FIG. 6, a third charge period $T_{CH3}$ is calculated from the end of the first charge period $T_{CH1}$ to a first time the second charge energy level $C_{CH2}$ crosses the actual consumption line P. A third charge energy $E_{CH3}$ is calculated from the preselected charge rate $R_{CH}$ and the third charge period $T_{CH3}$. A fourth charge period $T_{CH4}$ is calculated from a second time the second charge energy level $C_{CH2}$ crosses the actual consumption line P to a start of the second charge period $T_{CH2}$. A fourth charge energy $E_{CH4}$ is calculated from the preselected charge rate $R_{CH}$ and the fourth charge period $T_{CH4}$.

The method then moves to step S30, where it is determined whether or not the third charge energy $E_{CH3}$ is greater than the fourth charge energy $E_{CH4}$. If the third charge energy $E_{CH3}$ is greater than the fourth charge energy $E_{CH4}$, the method moves to step S32. If the third charge energy $E_{CH3}$ is less than or equal to the fourth charge energy $E_{CH4}$, the method moves to step S34.

When the third charge energy $E_{CH3}$ is greater than the fourth charge energy $E_{CH4}$, in step S32 and shown in FIG. 6, an idle energy $E_X$ is selected between the third charge energy $E_{CH3}$ and the fourth charge energy $E_{CH4}$. A fifth charge period $T_{CH5}$ is calculated from the end of the first charge period $T_{CH1}$ until a time the idle energy $E_X$ is reached at the preselected charge rate $R_{CH}$. A sixth charge period $T_{CH6}$ is calculated as the time required to charge at the preselected charge rate $R_{CH}$ from the idle energy $E_X$ to the second charge energy $E_{CH2}$. In FIG. 6, the idle energy $E_X$ is the third charge energy $E_{CH3}$, so the fifth charge period $T_{CH5}$ is equal to the third charge period $T_{CH3}$. An idle period $T_X$ is set between the fifth charge period $T_{CH5}$ and the sixth charge period $T_{CH6}$. In step S24, the power exchange curve Z is calculated as illustrated in FIG. 6. In step S26, power is exchanged between the EV battery and the power consumer or power grid according to the power exchange curve Z. As shown in FIG. 6, the battery is charged from the connection time $T_C$ through the fifth charge period $T_{CH5}$ at the charge rate $R_{CH}$, idled from the end of the fifth charge period $T_{CH5}$ to the start of the sixth charge period $T_{CH6}$ and charged through the sixth charge period $T_{CH6}$ to the required departure time $T_D$ at the charge rate $R_{CH}$.

When the third charge energy $E_{CH3}$ is less than or equal to the fourth charge energy $E_{CH4}$ in step S30, the method moves to step S34 to determine the best predicted power consumption curve Q' to minimize the expected peak energy level.

Figure 7:
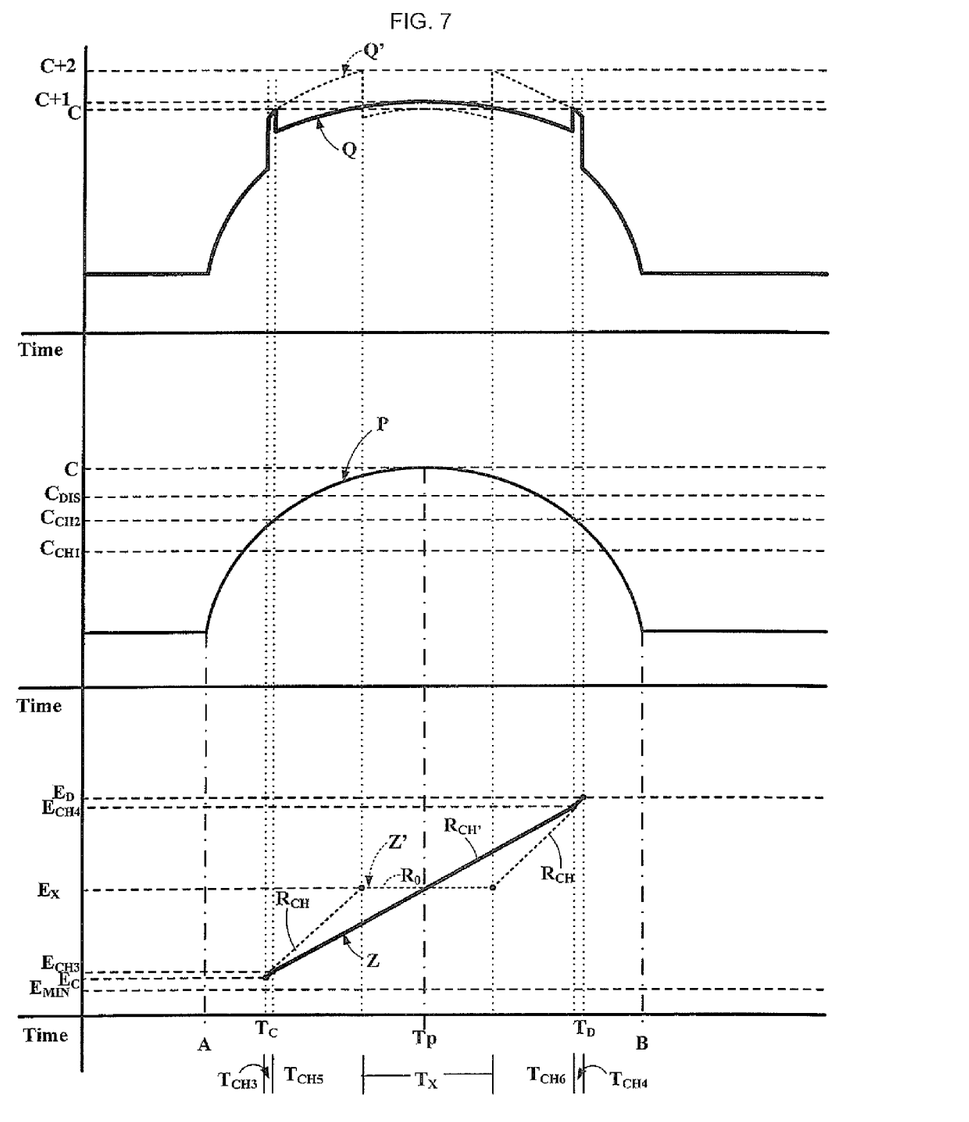
FIG. 7 is a graph illustrating a power exchange curve wherein a third charge energy is less than a fourth charge energy according to the methods disclosed herein.
Figure 8:
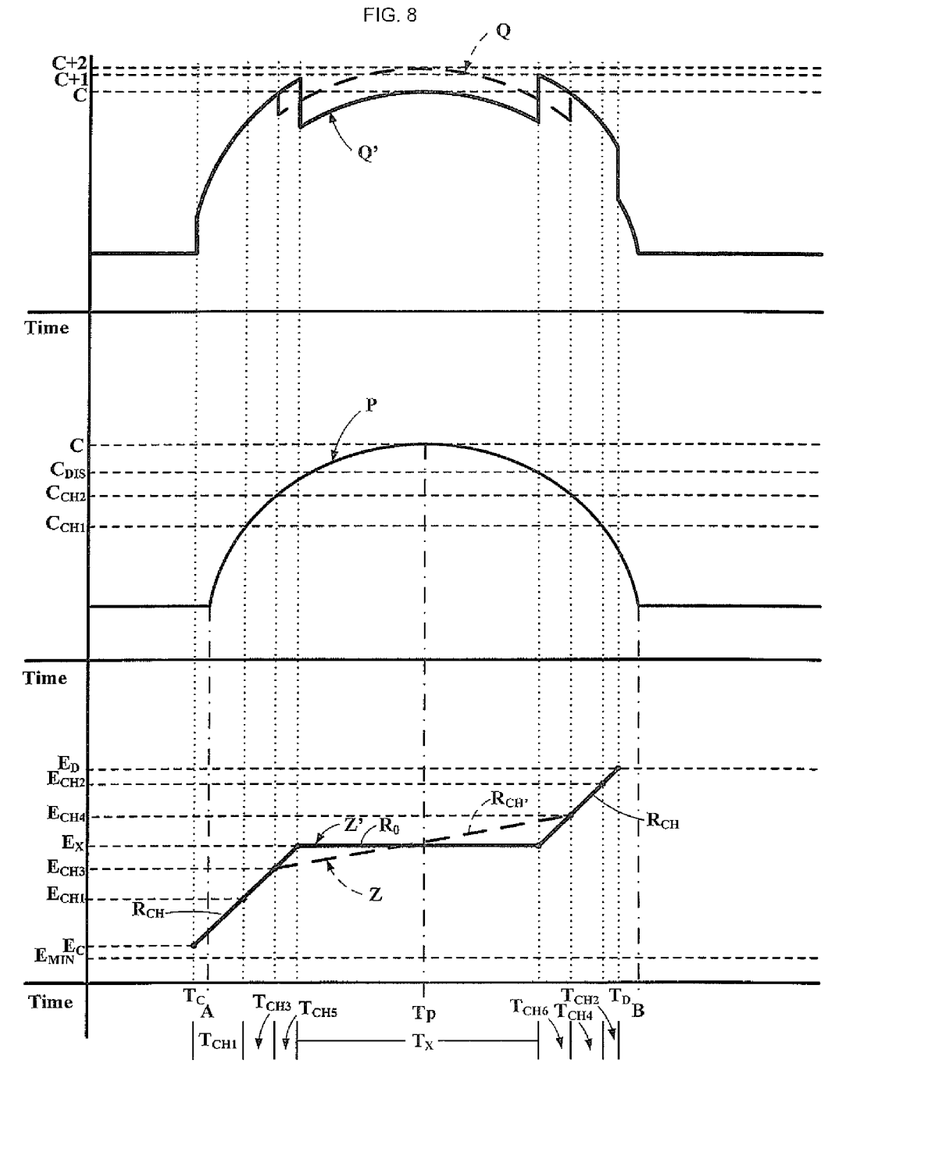
FIG. 8 is a graph illustrating another power exchange curve wherein a third charge energy is less than a fourth charge energy according to the methods disclosed herein.

FIGS. 7 and 8 illustrate the minimization of the expected peak energy level with two different results. A revised charge rate $R_{CH'}$ is calculated to charge from the third charge energy $E_{CH3}$ to the fourth charge energy $E_{CH4}$. A first power exchange curve Z is calculated based on charging the battery at the preselected charge rate $R_{CH}$ from the connection time $T_C$ through the third charge period $T_{CH3}$, charging the battery at the revised charge rate $R_{CH'}$ from the third charge period $T_{CH3}$ to the fourth charge period $T_{CH4}$, and charging the battery at the preselected charge rate $R_{CH}$ from a start of the fourth charge period $T_{CH4}$ to the required departure time $T_D$.

An alternative, or second power exchange curve Z' is also calculated. An idle energy $E_X$ between the third charge energy $E_{CH3}$ and the fourth charge energy $E_{CH4}$ is selected so that a peak energy consumption is minimized. For instance, the idle energy $E_X$ can be selected so that the peak energy consumption at the end of a fifth charge period $T_{CH5}$ equals a peak energy consumption at a sixth charge period $T_{CH6}$, as illustrated in FIGS. 7 and 8. The fifth charge period $T_{CH5}$ begins at the end of the third charge period $T_{CH3}$ and ends when the idle energy $E_X$ is reached based on the preselected charge rate $R_{CH}$. The sixth charge period $T_{CH6}$ ends at the start of the fourth charge period $T_{CH4}$ and begins at a time that provides a sufficient period to charge at the preselected charge rate $R_{CH}$ from the idle energy $E_X$ to the fourth charge energy $E_{CH4}$. The second power exchange curve Z' is calculated based on charging the battery at the preselected charge rate $R_{CH}$ from the connection time $T_C$ through the fifth charge period $T_{CH5}$, idling the battery from the end of the fifth charge period $T_{CH5}$ to the start of the sixth charge period $T_{CH6}$ and charging the battery at the preselected charge rate $R_{CH}$ at the sixth charge period $T_{CH6}$ to the required departure time $T_D$.

A first predicted power consumption curve Q is determined based on the first power exchange curve Z and a second predicted power consumption curve Q' determined based on the second power exchange curve Z'. In step S36 the predicted power consumption curve that provides the minimum peak energy level is selected. As seen in FIG. 7, the first predicted power consumption curve Q representing the use of the revised charge rate $R_{CH'}$ results in the smallest increase in the expected peak energy level C+1. As seen in FIG. 8, the second predicted power consumption curve Q', representing the use of the idle period $T_X$, results in the smallest increase in the expected peak energy level C+1.

The method then goes to step S26 to exchange power in accordance with the power exchange curve associated with the selected predicted power consumption curve. For example, in FIG. 7, the battery is charged at the charge rate $R_{CH}$ from the connection time $T_C$ through the third charge period $T_{CH3}$, charged at the revised charge rate $R_{CH'}$ from the end of the third charge period $T_{CH3}$ to the start of the fourth charge period $T_{CH4}$ and charged at the charge rate $R_{CH}$ through the fourth charge period $T_{CH4}$ to the required departure time $T_D$. In FIG. 8, the battery is charged at the charge rate $R_{CH}$ from the connection time $T_C$ through the fifth charge period $T_{CH5}$, idled from the end of the fifth charge period $T_{CH5}$ to the start of the sixth charge period $T_{CH6}$ and charged at the charge rate $R_{CH}$ through the sixth charge period $T_{CH6}$ to the required departure time $T_D$.

The order in which the steps are described is not meant to be limiting. If the steps can be performed in a different order while arriving at the same result, than that order is contemplated herein and in the claims.

The systems and methods herein can be implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. The methods can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein. In the claims, the term "processor" should be understood as including any the foregoing, either singly or in combination. Herein, the terms "program" and "process" should be understood to run on the processor.

Further, all or a portion of embodiments described herein can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The methods disclosed may incorporate user input for one or more variables. The processor used for these methods can include a user interface, a display, a key pad, a touch screen and any other devices that are known to those skilled in the art to assist in the interface between processor and user.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method performed by a processor for decreasing peak energy consumption of a power consumer during power exchange with a battery of a vehicle, the method comprising:
    preprogramming an actual consumption line based on expected power usage, the actual consumption line having a peak energy consumption;
    determining a connection time of the battery when the battery is connected to the power consumer, a connection energy of the battery at the connection time, a required departure time of the battery, a required departure energy;
    calculating a power exchange curve during a connection period between the connection time and the required departure time configured to minimize an expected peak energy consumption while securing the required departure energy by the required departure time, wherein calculating the power exchange curve comprises:
        preselecting a charge rate and a discharge rate;
        calculating a first charge energy level from the peak energy consumption less the discharge rate and the charge rate;
        calculating a first charge period from the connection time and a first time the first charge energy line crosses the actual consumption line;
        calculating a second charge period from the required departure time and a second time the first charge energy line crosses the actual consumption line;

calculating a first charge energy at an end of the first charge period using the charge rate;

calculating a second charge energy at a start of the second charge period using the charge rate;

if the first charge energy is greater than the second charge energy, calculating a discharge energy level from the peak energy consumption less the discharge rate; and calculating a revised discharge rate and a discharge period corresponding to the discharge energy level;

charging the battery during the first charge period at the charge rate; and charging the battery during the second charge period at the charge rate.

2. The method of claim 1, wherein calculating the revised discharge rate comprises:

calculating a discharge period between a first time and a second time the discharge energy level crosses the actual consumption line;

calculating the revised discharge rate from the discharge period and a difference between the first charge energy and the second charge energy.

3. The method of claim 2 further comprising:

discharging the battery during the discharge period at the revised discharge rate; and idling power exchange during idle periods, idle periods occurring between the first charge period and the discharge period and between the discharge period and the second charge period.

4. The method of claim 1, wherein, if the first charge energy is less than the second charge energy:

calculating a second charge energy level from the peak energy consumption less the charge rate; and calculating extended charge periods based on the second charge energy level.

5. The method of claim 4, wherein calculating extended charge periods comprises:

calculating a third charge period from the end of the first charge period to a first time the second charge energy level crosses the actual consumption line;

calculating a third charge energy from the charge rate and the third charge period;

calculating a fourth charge period from a second time the second charge energy level crosses the actual consumption line to a start of the second charge period; and calculating a fourth charge energy from the charge rate and the fourth charge period.

6. The method of claim 5, wherein if the third charge energy is greater than the fourth charge energy, selecting an idle energy between the third charge energy the fourth charge energy;

calculating a fifth charge period from an end of the first charge period to a time when the idle energy is reached at the preselected charge rate;

calculating a sixth charge period;

setting an idle period between the fifth charge period and the sixth charge period; and if the third charge energy is less than the fourth charge energy, minimizing the expected peak energy consumption.

7. The method of claim 6 further comprising:

charging the battery from the connection time through the fifth charge period at the charge rate;

idling the battery through the idle period; and charging the battery through the sixth charge period to the required departure time at the charge rate.

8. The method of claim 6, wherein minimizing the expected peak energy consumption comprises:

calculating a revised charge rate to charge from the third charge energy to the fourth charge energy, and plotting a first charge curve;

determining an idle energy between the third charge energy and the fourth charge energy so that a peak energy consumption is minimized, determining a fifth charge period from the end of the third charge period until the idle energy is reached, determining a sixth charge period prior to the start fourth charge period based on the idle energy and plotting a second charge curve; and selecting one of the first charge curve and the second charge curve that minimizes the expected peak energy consumption.

9. The method of claim 8, wherein if the first charge curve is selected, the method further comprises:

charging the battery at the charge rate from the connection time through the third charge period;

charging the battery at the revised charge rate from the third charge period to the fourth charge period; and charging the battery at the charge rate through the fourth charge period to the required departure time.

10. The method of claim 8, wherein if the second charge curve is selected, the method further comprises:

charging the battery at the charge rate from the connection time through the fifth charge period;

idling the battery from the end of the fifth charge period to the start of the sixth charge period; and charging the battery at the charge rate through the sixth charge period to the required departure time.

11. The method of claim 8, wherein the peak energy consumption during the fifth charge period equals a peak energy consumption during the sixth charge period.

12. The method of claim 1, wherein determining one or both of the required departure time and the required departure energy comprises receiving a user input.

13. The method of claim 1, wherein the required departure energy is a default departure energy.

14. A system for decreasing peak energy consumption of a power consumer comprising:

a system controller preprogramed with an actual consumption line based on expected power usage, the actual consumption line having an actual peak energy consumption; and a vehicle charger in communication with the system controller to receive instructions on charging and discharging from the system controller, wherein the system controller is operable to:

determine a connection time of the battery when the battery is connected to the power consumer, a connection energy of the battery at the connection time, a required departure time of the battery, a required departure energy; and calculate a power exchange curve during a connection period between the connection time and the required departure time configured to minimize an expected peak energy consumption while securing the required departure energy by the required departure time, wherein, when calculating the power exchange curve, the system controller is further operable to:

preselect a charge rate and a discharge rate;

calculate a first charge energy level from the peak energy consumption less the discharge rate and the charge rate;

calculate a first charge period from the connection time and a first time the first charge energy line crosses the actual consumption line;

calculate a second charge period from the required departure time and a second time the first charge energy line crosses the actual consumption line;

calculate a first charge energy at an end of the first charge period using the charge rate;

calculate a second charge energy at a start of the second charge period using the charge rate;

if the first charge energy is greater than the second charge energy, calculate a discharge energy level from the peak energy consumption less the discharge rate; and calculate a revised discharge rate and a discharge period corresponding to the discharge energy level, wherein the vehicle charger discharges the battery at the revised discharge rate.

15. The system of claim 14, wherein, when calculating the revised discharge rate, the system controller is further operable to:

calculate a discharge period between a first time and a second time the discharge energy level crosses the actual consumption line;

calculate the revised discharge rate from the discharge period and a difference between the first charge energy and the second charge energy; and provide instructions to:
  charge the battery during the first charge period at the charge rate;
  discharge the battery during the discharge period at the revised discharge rate;
  charge the battery during the second charge period at the charge rate; and
  idle power exchange during idle periods, idle periods occurring between the first charge period and the discharge period and between the discharge period and the second charge period.

16. The system of claim 14, wherein, if the first charge energy is less than the second charge energy, the system controller is further operable to:

calculate a second charge energy level from the peak energy consumption less the charge rate; and calculate extended charge periods based on the second charge energy level by:
  calculating a third charge period from the end of the first charge period to a first time the second charge energy level crosses the actual consumption line;
  calculating a third charge energy from the charge rate and the third charge period;
  calculating a fourth charge period from a second time the second charge energy level crosses the actual consumption line to a start of the second charge period; and
  calculating a fourth charge energy from the charge rate and the fourth charge period.

17. The system of claim 16, wherein if the third charge energy is greater than the fourth charge energy, the system controller is further operable to select an idle energy between the third charge energy the fourth charge energy;

calculate a fifth charge period from an end of the first charge period to a time when the idle energy is reached at the preselected charge rate;

calculate a sixth charge period;

set an idle period between the fifth charge period and the sixth charge period; and if the third charge energy is less than the fourth charge energy, minimize the expected peak energy consumption.

18. The system of claim 17, wherein, when minimizing the expected peak energy consumption, the system controller is further operable to:

calculate a revised charge rate to charge from the third charge energy to the fourth charge energy, and plot a first charge curve;

determine an idle energy between the third charge energy and the fourth charge energy so that a peak energy consumption is minimized, determine a fifth charge period from the end of the third charge period until the idle energy is reached, determine a sixth charge period prior to the start of the fourth charge period based on the idle energy and plotting a second charge curve; and select one of the first charge curve and the second charge curve that minimizes the expected peak energy consumption.

* * * * *